United States Patent Office 2,901,340
Patented Aug. 25, 1959

2,901,340
METHOD OF PRODUCING CONCENTRATED MIXTURES OF NITRIC AND PHOSPHORIC ACID

Georg Von Semel, Berlin-Grunewald, and Heinz Lehmann, Berlin-Neukolin, Germany, assignors to Pintsch Bamag A.-G., Berlin, Germany No Drawing. Application December 26, 1956
Serial No. 630,443

Claims priority, application Germany January 6, 1956

7 Claims. (Cl. 71—37)

The present invention relates to a method of producing concentrated mixtures of nitric acid and phosphoric acid, and more particularly to the production of phosphoric and nitric acids in which both acids are in very high concentration.

It is well known that it is not possible to produce mixtures of nitric acid and phosphoric acid having a high content of both acids, i.e. a concentration of nitric acid of between 52 and 58 percent and of phosphoric acid of between 25 and 40 percent, which mixtures of acid may be used as fertilizers, by the mixing of the customarily obtainable acids. The following example will explain the above:

Thus, for example, if it is desired to obtain a mixed acid containing 20 percent phosphoric acid and 45 percent nitric acid, by the mixing of acids which are customarily obtainable, then it would be necessary to mix the acids in either of the following proportions:

(a) 80 parts of nitric acid with a concentration of 56.3 percent, and 20 parts of phosphoric acid with a concentration of 100 percent.

(b) 54 parts of phosphoric acid with a concentration of 37 percent and 46 parts of nitric acid with a concentration of 98 percent.

The production of very concentrated acids is extremely difficult and costly and requires the use of very expensive apparatus. This applies both to nitric acid and to phosphoric acid.

A method has been devised for obtaining higher concentrations of mixtures of nitric and phosphoric acid by utilizing instead of water, which is normally utilized in the production of nitric acid, a phosphoric acid solution. The absorption of nitrogen oxide gases in phosphoric acid proceeds rather well and the desired concentration of phosphoric and nitric acids can be achieved in this manner.

It is a primary object of the present invention to provide an improved method of obtaining concentrated mixtures of nitric and phosphoric acids by the absorption of nitrogen oxide gases by phosphoric acid solutions.

It is still another object of the present invention to provide a method of producing mixtures of nitric acid and phosphoric acid in high concentration of both acids by the absorption by phosphoric acid of nitrogen oxide gases whereby such absorption is improved and higher concentrations of acids can be obtained.

Other objects and advantages of the present invention will be apparent from a further reading of the specification and of the appended claims.

With the above objects in view, the present invention mainly consists in a method of producing concentrated mixtures of nitric acid and phosphoric acid in which a nitrogen oxide gas is passed into a dilute phosphoric acid solution having an inorganic salt dissolved therein, whereby the nitrogen oxide gas is absorbed and converted to nitric acid, the absorption of the nitrogen oxide gas being promoted by the inorganic salt, thereby forming a concentrated mixture of nitric and phosphoric acids.

It has been discovered that if an inorganic salt is dissolved in phosphoric acid, then the absorption of the nitrogen oxide gas e.g. nitrogen dioxide, by the phosphoric acid is improved so that the absorption proceeds better and faster and so that higher concentrations of nitric acid are obtainable.

In accordance with the present invention nitrogen oxide gases such as those which are obtained by the burning of ammonia or gases obtained in other processes are passed into a solution of dilute phosphoric acid having an inorganic salt dissolved therein, whereby the nitrogen oxide gas is absorbed and nitric acid is formed so that a mixture of nitric acid and phosphoric acid is obtained. By proceeding in this manner there is obtained in comparison with the absorption of nitrogen oxide gases by pure phosphoric acid a higher yield and a higher concentration of the resulting mixed acid.

The nitrogen oxide gas, e.g. nitrous oxide, nitric oxide, or nitrogen dioxide (or nitrogen peroxide), or mixtures thereof is preferably passed into the dilute phosphoric acid solution having the inorganic salt dissolved therein along with a gas containing free oxygen e.g. air. The preferred inorganic salts which may be utilized in accordance with the present invention are the salts of metals of the first and second groups of the periodic table, for example potassium sulfate, sodium nitrate, calcium nitrate, potassium nitrate, magnesium nitrate, magnesium sulfate, etc. The salt may be dissolved in the phosphoric acid solution in any amount up to the solubility limit of a particular salt. Generally the phosphoric acid solution should contain at least one gram of the salt per 100 cc. of the phosphoric acid solution, and most preferably about 5 grams of salt per each 100 cc. of the phosphoric acid solution. The amount of phosphoric acid in the phosphoric acid solution may vary within all possible ranges, although according to the preferred embodiment of the present invention where it is desired to obtain a mixed acid having a high concentration of both nitric acid and phosphoric acid, a phosphoric acid solution of between 25–50 percent concentration of phosphoric acid is preferably utilized.

The absorption of the nitrogen oxide gas by the phosphoric acid solution having the inorganic salt dissolved therein can be carried out in any suitable apparatus, and in whatever apparatus utilized the results are improved by the presence of the inorganic salt in accordance with the present invention over the absorption of nitrogen oxide gases in pure phosphoric acid. It is also possible to add to the phosphoric acid sodium nitrate and sodium nitrite which are formed in nitric acid installations which utilize alkali absorption.

The following examples are given to further illustrate the present invention, the scope of the invention not however being limited to the specific details of the example.

Each of the following tests constitutes a separate example, comparative test 1 being compared with comparative test 2, and comparative test 3 being compared with comparative test 4 to illustrate the advantageous results of the present invention.

The examples (tests) were carried out as follows: Nitrogen dioxide ($NO_2$) was mixed with air and introduced into a flask. In tests 1 and 2 the nitrogen dioxide-air mixture was introduced into two closed flasks connected in parallel, the flask for test 1 containing no salt, and the flask for test 2 containing 5 grams of potassium sulfate. Likewise, in tests 3 and 4 the nitrogen dioxide-air mixture was introduced into two closed flasks connected in parallel, the flask for test 3 containing no salt and the flask for test 4 containing 5 grams of potassium sulfate. In Examples 1–4, the nitrogen dioxide-air mixture consisted of equal parts by volume of nitrogen dioxide and air. In tests 5 and 6, the mixture consisted of 12 percent by volume of nitrogen dioxide and the remainder air. In each of the examples room temperature was utilized, i.e. 21° C. The gas was introduced into the phosphoric acid solutions until there was no further increase of volume or weight. Then the excess nitrogen dioxide gas was removed from the flask by pasing of air therethrough, and thereafter the analysis was made.

The following tables analyze the results of the examples:

|  | Comparative Test | | Comparative Test | |
|---|---|---|---|---|
|  | No. 1 | No. 2 | No. 3 | No. 4 |
| Starting Acid: | | | | |
| $H_3PO_4$ (25% acid)_____cm.³__ | 100 | 100 | | |
| $H_3PO_4$ (50% acid)_____do____ | | | 100 | 100 |
| $K_2SO_4$_____gr__ | | 5 | | 5 |
| Final Acid: | | | | |
| $H_3PO_4$_____wt. percent__ | 13.75 | 12.33 | 34.06 | 29.87 |
| $HNO_3$_____do____ | 53.20 | 56.80 | 39.20 | 46.20 |
| $H_2O$_____do____ | 33.05 | 30.69 | 26.74 | 21.70 |
| $K_2SO_4$_____do____ | | 2.18 | | 2.23 |
| $HNO_3+H_3PO_4$_____do____ | 66.95 | 67.13 | 73.25 | 76.07 |
| Relationship: $H_3PO_4/HNO_3$=____ | 0.258 | 0.217 | 0.870 | 0.646 |
| Formed $HNO_3$ in gr. per 100 cm.³ $H_3PO_4$. | | | | |
| Solution without salt addition_____ | 100 | 130 | 78 | 105 |
| Formed $HNO_3$ in gr. per 100 cm.³ water of the $H_3PO_4$_____ | 128 | 153 | 116.5 | 157 |

|  | Test | |
|---|---|---|
|  | No. 5 | No. 6 |
| Starting Acid: | | |
| $H_3PO_4$ (34% acid)_____cm.³__ | 100 | 100 |
| $K_2SO_4$_____gr__ | | 5 |
| $NaNO_3$_____do____ | 5 | |
| Final Acid: | | |
| $H_3PO_4$_____wt. percent__ | 21.90 | 20.43 |
| $HNO_3$_____do____ | 43.00 | 46.85 |
| $H_2O$_____do____ | 32.48 | 30.18 |
| $K_2SO_4$_____do____ | | 2.54 |
| $NaNO_3$_____do____ | 2.62 | |
| $HNO_3+H_3PO_4$_____do____ | 64.9 | 67.28 |
| Relationship: $H_3PO_4/HNO_3$=_____ | 0.508 | 0.442 |
| Formed $HNO_3$ in gr. per 100 cm.³ $H_3PO_4$. | | |
| Solution without salt addition_____ | 84 | 92.4 |
| Formed $HNO_3$ in gr. per 100 cm.³ water of the $H_3PO_4$_____ | 107.1 | 117.6 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing concentrated mixtures of nitric acid and phosphoric acid, the step of passing a nitrogen oxide gas and a gas containing free oxygen into a dilute phosphoric acid solution having an inorganic salt selected from the group consisting of potassium sulfate, sodium nitrate, calcium nitrate, potassium nitrate, magnesium nitrate and magnesium sulfate dissolved therein in an amount between 1% by weight and the solubility limit of said salt, whereby said nitrogen oxide gas is absorbed and converted to nitric acid, the absorption of said nitrogen oxide gas being promoted by said inorganic salt, thereby forming a concentrated mixture of nitric and phosphoric acids.

2. In a method of producing concentrated mixtures of nitric acid and phosphoric acid, the step of passing a nitrogen oxide gas into a dilute phosphoric acid solution of 25–50% concentration having an inorganic salt selected from the group consisting of potassium sulfate, sodium nitrate, calcium nitrate, potassium nitrate, magnesium nitrate and magnesium sulfate dissolved therein in an amount between 1% by weight and the solubility limit of said salt, whereby said nitrogen oxide gas is absorbed and converted to nitric acid, the absorption of said nitrogen oxide gas being promoted by said inorganic salt, thereby forming a concentrated mixture of nitric and phosphoric acids.

3. In a method of producing concentrated mixtures of nitric acid and phosphoric acid, the step of passing a nitrogen oxide gas into a dilute phosphoric acid solution having an inorganic salt selected from the group consisting of potassium sulfate, sodium nitrate, calcium nitrate, potassium nitrate, magnesium nitrate and magnesium sulfate dissolved therein in an amount between 1% by weight and the solubility limit of said salt, whereby said nitrogen oxide gas is absorbed and converted to nitric acid, the absorption of said nitrogen oxide gas being promoted by said inorganic salt, thereby forming a concentrated mixture of nitric and phosphoric acids.

4. In a method of producing concentrated mixtures of nitric acid and phosphoric acid, the step of passing a nitrogen oxide gas into a dilute phosphoric acid solution having potassium sulfate dissolved therein in an amount between 1% and the solubility limit of said potassium sulfate, whereby said nitrogen oxide gas is absorbed and converted to nitric acid, the absorption of said nitrogen oxide gas being promoted by said potassium sulfate, thereby forming a concentrated mixture of nitric and phosphoric acids.

5. In a method of producing concentrated mixtures of nitric acid and phosphoric acid, the step of passing a nitrogen oxide gas into a dilute phosphoric acid solution having sodium nitrate dissolved therein in an amount between 1% and the solubility limit of said sodium nitrate, whereby said nitrogen oxide gas is absorbed and converted to nitric acid, the absorption of said nitrogen oxide gas being promoted by said sodium nitrate, thereby forming a concentrated mixture of nitric and phosphoric acids.

6. In a method of producing concentrated mixtures of nitric acid and phosphoric acid, the step of passing a nitrogen oxide gas and a gas containing free oxygen into a dilute phosphoric acid solution of 25–50% concentration having about 5% by weight of potassium sulfate dissolved therein, whereby said nitrogen oxide gas is absorbed and converted to nitric acid, the absorption of said nitrogen oxide gas being promoted by said inorganic salt, thereby forming a concentrated mixture of nitric and phosphoric acids.

7. In a method of producing concentrated mixtures of nitric acid and phosphoric acid, the step of passing a mixture of air and nitrogen dioxide gas into a dilute phosphoric acid solution having an inorganic salt selected from the group consisting of potassium sulfate, sodium nitrate, calcium nitrate, potassium nitrate, magnesium nitrate and magnesium sulfate dissolved therein in an amount between 1% by weight and the solubility limit of said salt, whereby said nitrogen oxide gas is absorbed and converted to nitric acid, the absorption of said nitrogen oxide gas being promoted by said inorganic salt, thereby forming a concentrated mixture of nitric and phosphoric acids.

References Cited in the file of this patent

UNITED STATES PATENTS 2,783,139    Datin _____ Feb. 26, 1957

FOREIGN PATENTS 370,706    Great Britain _____ Apr. 14, 1932
602,006    Great Britain _____ May 18, 1948
742,228    Great Britain _____ Dec. 21, 1955